E. C. CARROLL AND H. E. HUFFMAN.
DRIVING MECHANISM.
APPLICATION FILED JAN. 19, 1920.
1,370,087.
Patented Mar. 1, 1921.
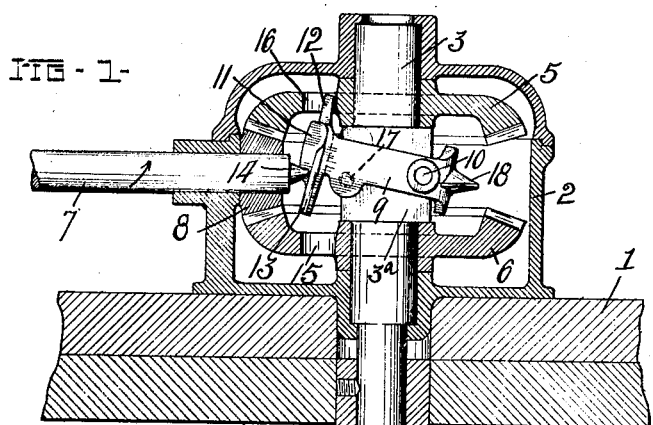
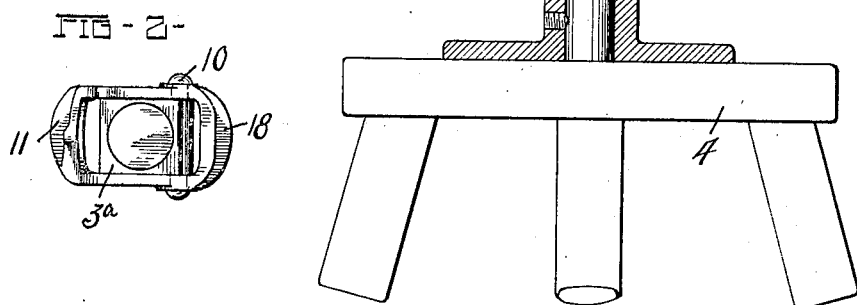
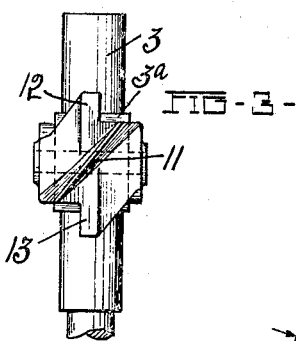
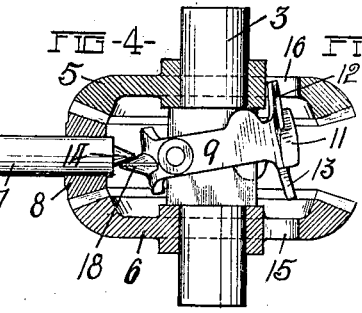
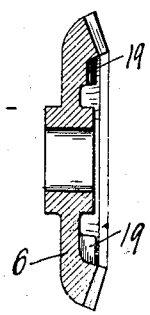
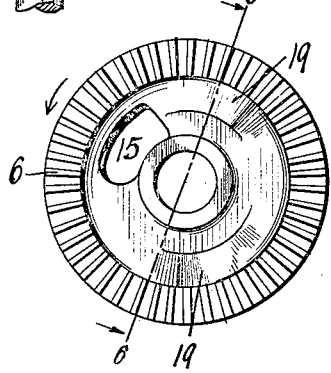
INVENTOR
Earl C. Carroll,
Harry E. Huffman,
By Owen Owen & Crampton,
Their attys

UNITED STATES PATENT OFFICE.

EARL C. CARROLL AND HARRY E. HUFFMAN, OF BRYAN, OHIO; SAID HUFFMAN ASSIGNOR OF HIS ENTIRE RIGHT TO AUGUST L. GEBHARD, OF BRYAN, OHIO.

DRIVING MECHANISM.

1,370,087.  Specification of Letters Patent.  Patented Mar. 1, 1921.

Application filed January 19, 1920. Serial No. 352,367.

*To all whom it may concern:*

Be it known that we, EARL C. CARROLL and HARRY E. HUFFMAN, citizens of the United States, and residents of Bryan, in the county of Williams and State of Ohio, have invented a certain new and useful Driving Mechanism; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to mechanisms for communicating rotary reciprocatory movements to one shaft from a continuous rotation in one direction of a driven shaft, and is intended particularly for use in connection with washing machines to impart rotary reciprocatory movements to the dolly shafts thereof.

In certain mechanisms of this character, two reversely driven gears are mounted loosely on the dolly shaft and a pawl member is carried by the shaft between the gears and operated during a running of the mechanism to engage the shaft first to one and then to the other of the gears so that a rotary reciprocatory motion is imparted to the dolly shaft from the gears, as is well understood in the art. In the use of such mechanisms the pawl is released from one gear and engaged to the other at predetermined points in a rotation of the dolly shaft, and intermediate such points is liable to and frequently does, especially when subject to a jar, move into engagement with both gears and lock the mechanism against further action, thereby necessitating a tearing down and retiming of the gearing to overcome the trouble.

The object of our invention is the provision of simple and efficient means for preventing the locking action of the mechanism above described, whereby to enhance the practicability and commercial value thereof.

The invention is fully described in the following specification, and while, in its broader aspect, it is capable of embodiment in numerous forms, a preferred embodiment thereof is illustrated in the accompanying drawings, in which,—

Figure 1 is a central vertical section of a mechanism embodying the invention with parts in full and with the reversing pawl just shifted from engagement with the lower to engagement with the upper gear. Fig. 2 is a top view of the dolly shaft and its reversing pawl. Fig. 3 is a side elevation thereof. Fig. 4 is a fragmentary section similar to Fig. 1, with the gears each turned half around from its position in Fig. 1 and with the pawl locked against releasing one and engaging the other in such position or having partial engagement with each gear to effect a locking thereof. Fig. 5 is an inner side view of one of the gears, and Fig. 6 is a section thereof on the line 6—6 in Fig. 5.

Referring to the drawings, 1 designates the top or cover of a washing machine tub, and 2 a gear case mounted thereon and forming a housing for the reversing mechanism embodying the invention. The dolly shaft 3 carrying the dolly 4, extends up through the top 1 and centrally through the case 2, being journaled in the top and bottom thereof, and loosely carries vertically spaced upper and lower bevel-gears 5 and 6, respectively, within the case. A drive shaft 7, which may receive its power from any suitable source, as well understood in the art, has one end projected through and journaled in a side of the case 2 and carrying a fixed pinion 8 within the case between the gears 5 and 6, in mesh with each, whereby a rotation of the shaft 7 imparts opposite or reverse rotation to the two gears.

The dolly shaft 3 is preferably, but not necessarily, provided with a squared portion 3ª between the two gears 5 and 6, which portion shoulders against the inner hub ends of the gears to maintain them in predetermined spaced relation. A clutch element 9, in the present instance of pawl form, is pivoted to said squared portion at one side of the shaft axis, as at 10, for rocking movements longitudinally thereof. The pawl 9, in the present instance, has an opening therethrough through which the shaft extends, and its nose portion, which crosses one side of the shaft, is provided at its outer side with a diagonally disposed cam rib 11, which is inclined relative to the plane of rotation of the shaft. The pawl nose is also provided at its upper edge with an upwardly projected catch lug 12 and at its lower edge with a downwardly projected catch lug 13, which lugs are preferably disposed in substantially vertical alinement.

The end of the shaft 7, which is disposed within the case 2, is provided with a preferably conical axial projection 14 which stands in the path of revolution of the cam rib 11 and coacts with the under side thereof, when the pawl and dolly shaft are being driven to the left or in counter-clockwise direction, to effect an upward rocking of the pawl to withdraw the lower catch lug 13 from a catch opening 15 in the lower gear 6 and to move the upper catch lug 12 into a catch opening 16 in the upper gear 5, thereby causing the gear 6 to run as an idler and the gear 5 to act to drive the pawl and dolly shaft to the right or in clockwise direction. When the pawl and shaft have nearly completed a revolution to the right the upper side of the cam rib 11 will move into coaction with the shaft projection 14 and cause a downward rocking of the pawl so as to withdraw the upper lug 12 from the opening 16 in the gear 5 and cause the lower lug 13 to enter the catch opening 15 of the lower gear, so that the pawl and dolly shaft are then driven to the left with the lower gear 6.

The catch openings 15 and 16 are of elongated segmental form to permit a limited rotary movement of the respective catch lug of the pawl therein while shifting from engagement with one to engagement with the other gear, and the openings of the two gears are so disposed that one lug begins to enter the opening of its gear before the other lug is entirely released from the opening of its gear. It will be understood that the opposite end walls of the openings 15 and 16 have driving coaction with the respective catch lugs 13 and 12 so that one gear drives the pawl in one direction and the other gear drives the pawl in the opposite direction. In practice the dolly shaft receives approximately seven-eighths of a turn, the other eighth of each rotation being lost in the shifting or reversing movement of the pawl.

The pawl is yieldingly held in any position of its movement by a coiled expansion spring 17, which is disposed in a transverse opening in the side of the squared portion 3ª of the dolly shaft adjacent to the pawl nose, and the opposite ends of the spring act against the legs or side arms of the pawl to frictionally resist a rocking movement thereof relative to the dolly shaft.

When the gears 5 and 6 have received substantially one-half of a turn from the shifting position of the pawl they will vertically register, as shown in Fig. 4, so that if a jar takes place when the gears are in this position and the pawl is in engagement with the upper gear, it is liable to and frequently does move either completely from engagement with one to engagement with the other gear or a sufficient distance to partially engage each gear, thereby locking the gears against further turning movements. In order to prevent this action from taking place the tail end of the pawl 9, or the end thereof adjacent to its pivot, is provided with a transverse rib 18, which, when the lug 12 is in full engagement with the upper gear, is adapted to pass under and coact with the shaft projection 14 to retain the pawl in such position during the critical period when the opening of one gear is passing that of another, as shown in Fig. 4. The lug 18 is of sufficient length to remain in contact with the shaft projection 14 during the complete period of passing of one gear opening by the other. During the reverse movement of the pawl when in engagement with the lower gear, the rib 18 passes over the shaft projection 14 and coacts therewith to prevent a disengaging of the pawl from the lower gear during the critical period.

Each gear 5 and 6 is provided preferably at each side of its pawl engaging opening and less than 180° therefrom with a cam incline or elevation 19 gradually inclining or rising in a direction opposed to the direction of rotation of the respective gear. When the pawl 9 is in engagement with and being driven by the gear 5, the lower lug 13 thereof coacts with the oppositely revolving cam surface 19 of the lower gear intermediate the two positions of the pawl and gears shown in Figs. 1 and 4 so that the pawl is held in engagement with the gear 5 until it has been turned a sufficient distance for the rib 18 thereof to engage under the shaft projection 14. The same action takes place when the pawl is in reversed position, or in engagement with the opening 15 of the lower gear, as the cams 19 of the gear member 5 then coact with the lug 12 of the pawl to prevent a rocking of the pawl from engagement with the gear 6 until the rib 18 has engaged the top of the shaft projection 14. It is preferable to slightly lower the engaging end of the rib 18 which is intended to pass under the shaft projection 14 and to slightly raise the end of the rib 18 which is intended to pass over the projection 14 to facilitate the proper coacting of the parts in the respective directions of rotation of the pawl.

It is evident by the use of our improvement that the pawl 9 is retained positively in engagement with one or the other of the gears until it has completed its cycle of movement in either direction and is in reversing position thereby preventing any accidental reversing movement of the pawl intermediate the proper reversing positions thereof. This is an important feature as otherwise when a locking of the gears takes place by reason of the pawl moving partly into engagement with each gear at the point where the gear openings 15 and 16 pass each other it is necessary to take the gearing apart and to then reassemble and retime the pawl and gearing which can only be done, customarily, by persons familiar with the construction and operation of the reversing mechanism.

We wish it understood that our invention is not limited to any specific construction, arrangement or form of the parts, as it is capable of numerous modifications and changes without departing from the spirit of the claims.

Having thus described our invention, what we claim as new, and desire to secure by Letters Patent, is,—

1. In a mechanism of the class described, a driven shaft, a pair of members spaced longitudinally of the shaft and driven in opposite directions, a clutch element carried by the shaft for movements longitudinally thereof into clutch engagement with first one and then the other of the members, said element having ribs thereon at different sides of the shaft, and an element intermediate the planes of rotation of said members and standing in the paths of movement of the ribs on the clutch element to coact with one rib at a predetermined point in each revolution of the element to cause a movement thereof to engage one and release the other of said members and to coact with the other of said ribs during a predetermined portion of each revolution of the shaft to prevent a releasing movement of the clutch element from the engaged member.

2. In a mechanism of the class described, a driven shaft, a pair of members axially spaced longitudinally of the shaft and driven in opposite directions, a pawl pivoted to the shaft for rocking movements longitudinally thereof and having ribs at each end thereof, said pawl being engageable with one or the other of the members to cause a driving of the shaft from the engaged member, a drive shaft projecting between said members in driving connection therewith and having its inner end disposed in the path of revolution of the pawl ribs to coact with one at a predetermined point in each revolution of the pawl to move it from engagement with one to engagement with the other member, and vice versa, and to coact with the other rib during a predetermined portion of each revolution of the pawl to retain the pawl in engagement with the engaged member.

3. In a mechanism of the class described, a drive shaft, a driven shaft, a pair of members driven in opposite directions by the drive shaft and axially spaced longitudinally of the driven shaft, a pawl carried by the driven shaft for rotation therewith and movable into clutch engagement with first one and then the other of said members, said pawl and drive shaft having coacting means which coöperate to reverse the position of the pawl to release one and engage the other of said members at a predetermined point in each revolution of the driven shaft and which coöperate to prevent a release of the engaged member during a predetermined portion of each revolution of the pawl, and means carried by each member for coacting with the pawl during a driving thereof by the other member to retain it in engagement with the driving member during a predetermined portion of the revolution of the pawl.

4. In a mechanism of the class described, a driven shaft, a pair of oppositely driven members axially spaced longitudinally of the shaft, a clutch element carried by the shaft and adapted to have clutch engagement with either member to be driven thereby, said element having ribs thereon at different sides of the shaft, means disposed in the path of revolution of said ribs and adapted to coact with one at a predetermined point in each revolution of the shaft to reverse the position of the element to release the engaged member and engage the other member and to coact with the other rib during a predetermined portion of each revolution of the element to prevent its disengagement from the engaged member, and means on each member for coacting with the clutch element when driven by the other member to retain it in engagement with the driving member during a predetermined portion of its revolution therewith.

In testimony whereof we have hereunto signed our names to this specification.

EARL C. CARROLL.
HARRY E. HUFFMAN.